(12) United States Patent
Faisman et al.

(10) Patent No.: US 7,962,324 B2
(45) Date of Patent: Jun. 14, 2011

(54) METHOD FOR GLOBALIZING SUPPORT OPERATIONS

(75) Inventors: Alexander Faisman, Croton-on-Hudson, NY (US); Genady Grabarnik, Scarsdale, NY (US); Jonathan Lenchner, North Salem, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 11/845,907

(22) Filed: Aug. 28, 2007

(65) Prior Publication Data

US 2009/0063125 A1 Mar. 5, 2009

(51) Int. Cl.
*G06F 17/28* (2006.01)
*G06F 17/27* (2006.01)
*G06F 17/20* (2006.01)

(52) U.S. Cl. .................. 704/8; 704/2; 704/7; 704/9
(58) Field of Classification Search .................. None
See application file for complete search history.

(56) References Cited

U.S. PATENT DOCUMENTS

| | | | |
|---|---|---|---|
| 5,490,061 A * | 2/1996 | Tolin et al. ................... 704/2 |
| 5,794,218 A * | 8/1998 | Jennings et al. ............. 705/35 |
| 5,884,247 A | 3/1999 | Christy |
| 5,948,022 A | 9/1999 | Carleton et al. |
| 5,987,401 A | 11/1999 | Trudeau |
| 6,275,789 B1 * | 8/2001 | Moser et al. .................... 704/7 |
| 6,922,670 B2 | 7/2005 | Yamada et al. |
| 6,928,448 B1 | 8/2005 | Franz et al. |
| 6,934,704 B2 | 8/2005 | Okada et al. |
| 6,993,472 B2 * | 1/2006 | Redpath ........................ 704/2 |
| 6,993,474 B2 | 1/2006 | Curry et al. |
| 7,136,825 B2 | 11/2006 | Araki et al. |
| 7,139,752 B2 | 11/2006 | Broder et al. |
| 2002/0173946 A1 * | 11/2002 | Christy ......................... 704/2 |
| 2005/0010421 A1 * | 1/2005 | Watanabe et al. ........... 704/277 |
| 2006/0136194 A1 * | 6/2006 | Armstrong et al. ............. 704/4 |

OTHER PUBLICATIONS

Jeff Ruffini, "How to Achieve Multilingual Support: The Basics"; http://www.sourcingmag.com/content/c061011a.asp, 2006.

* cited by examiner

*Primary Examiner* — Matthew J Sked
(74) *Attorney, Agent, or Firm* — Ryan, Mason & Lewis, LLP

(57) ABSTRACT

Techniques are provided for globalizing handling of service management items. The techniques include obtaining a service management item in a language convenient to a first of two or more actors, translating the service management item into a language-neutral format to obtain a language-neutral service management item, applying one or more annotators to the service management item, translating the language-neutral service management item into a language convenient to a second of two or more actors acting on the service management item, and routing the translated service management item to the second of two or more actors. Techniques are also provided for generating a database of service management items in a language-neutral format.

20 Claims, 4 Drawing Sheets

METHOD FOR GLOBALIZING SUPPORT OPERATIONS

FIELD OF THE INVENTION

The present invention generally relates to information technology, and, more particularly, to information technology support operations.

BACKGROUND OF THE INVENTION

One goal for globalization of support operations is reducing the cost of key functions. Service support is an exemplary function and it requires qualified staff and appropriate technologies. While existing approaches are used to connect customers to service representatives across the globe, the problem with incorporating qualified staff remains largely unresolved. Currently, technology support is tightly coupled with the language of a support requestor and the language of support providers.

Existing approaches include, for example, U.S. Pat. No. 7,136,825 entitled "Work assignment system and method, distributed client/server system, and computer program storage," which includes work assignment system for assigning and composing a work formed from a plurality of work standards to a plurality of stations.

Also, existing approaches include, for example, U.S. Pat. No. 5,884,247 entitled "Method and apparatus for automated language translation," which includes representing natural-language sentences in accordance with a constrained grammar and vocabulary structured to permit direct substitution of linguistic units in one language for corresponding linguistic units in another language.

Another existing approach includes, for example, U.S. Pat. No. 6,928,448 entitled "System and method to match linguistic structures using thesaurus information," which includes a system and method for evaluating similarity among multiple data structures.

Existing approaches also include, for example, U.S. Pat. No. 7,139,752 entitled "System, method and computer program product for performing unstructured information management and automatic text analysis, and providing multiple document views derived from different document tokenizations," which includes a system architecture, components and a searching technique for an Unstructured Information Management System (UIMS).

Another existing approach includes, for example, U.S. Pat. No. 5,948,022 entitled "Remote collaboration system," which includes using multiple computers to hold a conference.

In countries with one or more populations that speak non-standard languages, or when dealing with individuals in more than one country, the support question should first go through people with appropriate language skills. These people may be unavailable at the time of the request, thus creating an issue for global support providers that fundamentally complicates and restricts support globalization and increases the cost of the technical support while potentially decreasing its quality.

SUMMARY OF THE INVENTION

Principles of the present invention provide techniques for globalizing support operations. An exemplary method (which can be computer-implemented) for globalizing handling of service management items, according to one aspect of the invention, can include steps of obtaining a service management item in a language convenient to a first of two or more actors, translating the service management item into a language-neutral format to obtain a language-neutral service management item, applying one or more annotators to the service management item, translating the language-neutral service management item into a language convenient to a second of two or more actors acting on the service management item, and routing the translated service management item to the second of two or more actors.

In an embodiment of the invention, an exemplary method for generating a database of service management items in a language-neutral format can include obtaining a service management item, translating the service management item into a language-neutral format to obtain a language-neutral service management item, applying one or more annotators to the service management item, and storing the language-neutral service management item in a searchable database.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
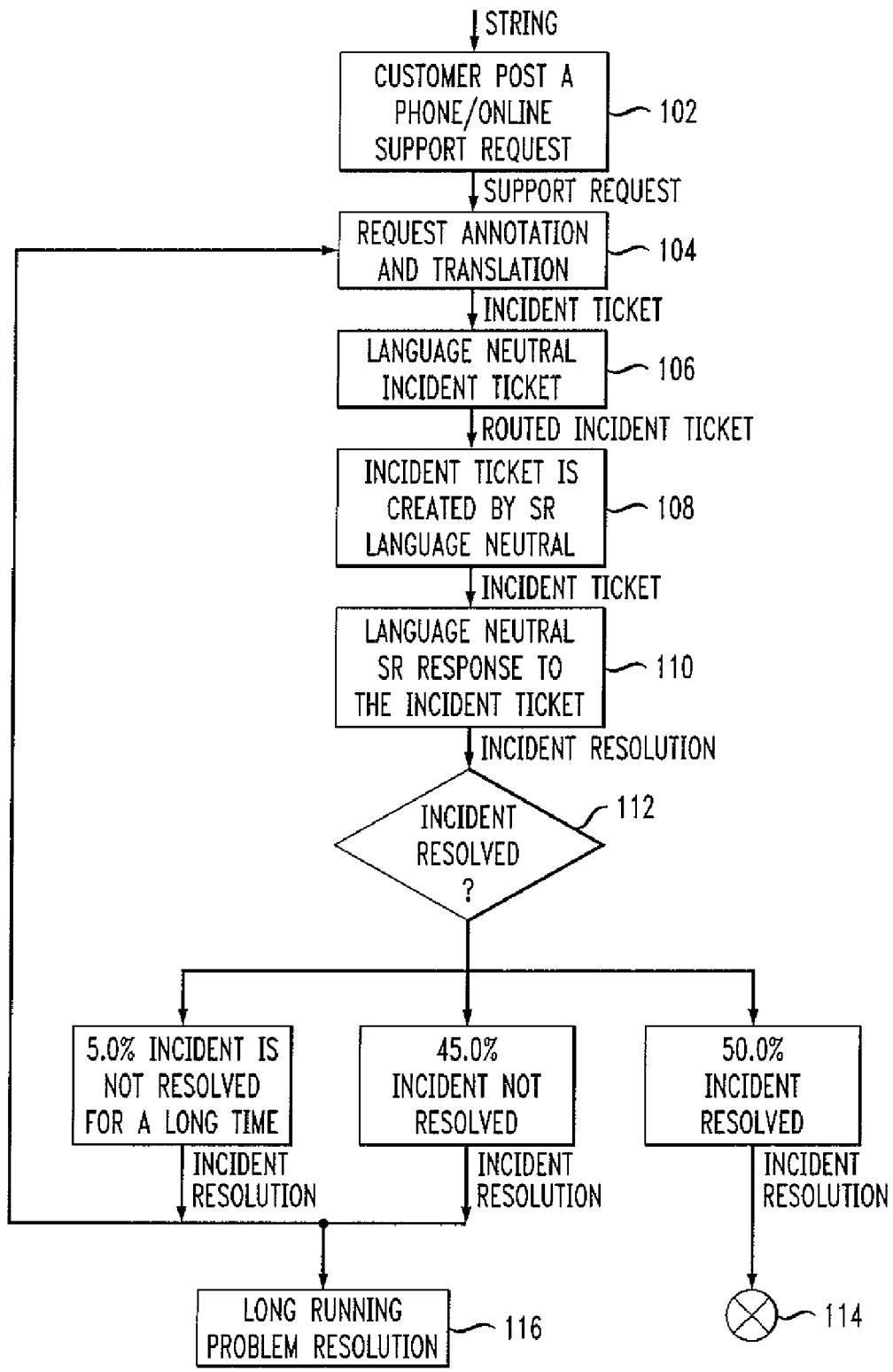
FIG. 1 is a diagram illustrating an exemplary workflow, according to one aspect of the invention.

Principles of the present invention reduce the cost of support services by translating new service management items (that is, actionable requests or tickets (for example, incident reports, problem records and change records)) to a language neutral format, or common base language, with the assistance of annotators. Once translated and stored, the documents are searched and routed using the language neutral format and translated back to the native or otherwise convenient language of the next person acting on the documents.

Also, principles of the present invention separate language-related requirements from the technical skills requirements for the global support of operations to reduce operation costs. One or more embodiments of the invention include language-independent problem ticket processing including real time annotation, enabling the ticket creator (or modifier) to validate annotations, improve understanding of the problem and hence reduce ticket-processing time, improve annotation quality, provide feedback to incrementally improve the annotators, and personalize the annotators (to an individual or team).

Translating incoming tickets to a language neutral format avoids the need to translate items from every language to every other language. If the number of total languages used by all ticket originators (for example, call takers, or end users placing electronic-tickets) is N then the translation cost is $O(N^2)$, while translation back and forth from a language neutral format to every language has cost O(N).

Translating a service management item (for example, a ticket or request) is complicated by the fact that actors such as, for example, call takers and others, often use jargon and shorthand to record ticketing information, including details regarding work done on tickets. An illustrative embodiment of the present invention introduces annotators specific to the ticketing/help center environment to make the recording of tickets simpler and more uniform, and also to facilitate effective translation. One or more embodiments of the invention include after-the-fact annotation, as well as real time annotation so that the ticket creator (or modifier) can validate the annotations. Real time annotation improves annotation quality, provides feedback to incrementally improve the annotators, and also may personalize the annotators, for example, in the case of recognizing and expanding on individual shorthand dialects. Also, real time annotation facilitates the ticket creator's ability to correct, edit and/or delete portions or the whole of the results of an annotation prior to the annotations being stored and prior to the translation to a language neutral format.

An illustrative embodiment of the present invention includes the following steps. An individual providing a service management item such as, for example, a customer, calls into a call center reporting a problem or requesting a change to certain aspects of a system or configuration. An actor (for example, a call-taker or customer service representative) obtains and/or records the information in a language that is most convenient for him or her. For example, an actor may obtain a service management item in the same language as used by the individual providing the service management item (for example, a caller), though not necessarily. Because call-takers are often measured based on their average resolution time, the call is often recorded using shorthand and may contain many spelling errors which are not efficient to correct in real time.

Prior to completion of the ticket, the ticket is translated into a language neutral form, (for example, to a common base language such as, for example, English). To assist in the translation, annotators are applied to the ticket. Annotators may be, for example, domain specific (that is, have detailed knowledge of the product area that is being supported so that, for example, product names and other named entities not generally found in a dictionary can be identified and their types (semantic classes) assigned). Before the ticket is formally closed, the call-taker can quickly peruse the annotations and correct or delete them. Annotators can be written, for example, to extract symptoms, (probable) causes and actions taken from textual descriptions, as well as to identify product names, product families, serial numbers, etc.

As another example, personalized annotators can be incorporated to identify and expand shorthand notations. These annotators can be created, for example, using known machine learning techniques. Moreover, since much shorthand is shared (for example, in English use of "b/c" for because, "w/o" for without), knowledge learned by watching one call-taker can be used to improve the shorthand annotators (expanders) for other actors. Shared shorthand may be specific to, for example, a company or workgroup. Also, annotators are personalized to learn the idiosyncratic recording methods of each individual actor and of individual workgroups.

Once the annotations are approved by an actor, they are stored with the document in the language neutral format. The annotations help improve the conversion of the document to a language neutral format as well as improve the conversion ultimately to the language of the next one or more actors acting on the document. Also, the annotations help downstream actors focus on what is important about a problem or a change request (for example, the problem symptoms, and (probable) cause).

FIG. 1 is a diagram illustrating an exemplary workflow, according to one aspect of the invention. FIG. 1 shows how a ticket processing service is organized in such a manner that the process provides separation of the technical skills from the language skills.

For example, as illustrated in the FIG. 1, a customer posts a phone or on-line support request in step 102. The request undergoes an annotation and translation process in step 104 to generate a language neutral ticket in step 106. The language neutral ticket is routed to a service representative (SR) (who can be, for example, language independent) who creates incident tickets in step 108.

In step 110, there is a SR response to the ticket. In step 112, a determination is made as to whether or not an incident is resolved. If it is resolved, then the workflow ends at step 114. If an incident is not resolved, the ticket returns to step 104 for additional annotation and translation. If an incident is not resolved for a few iterations, it goes into a category of long-running problem resolutions in step 116.

Figure 2:
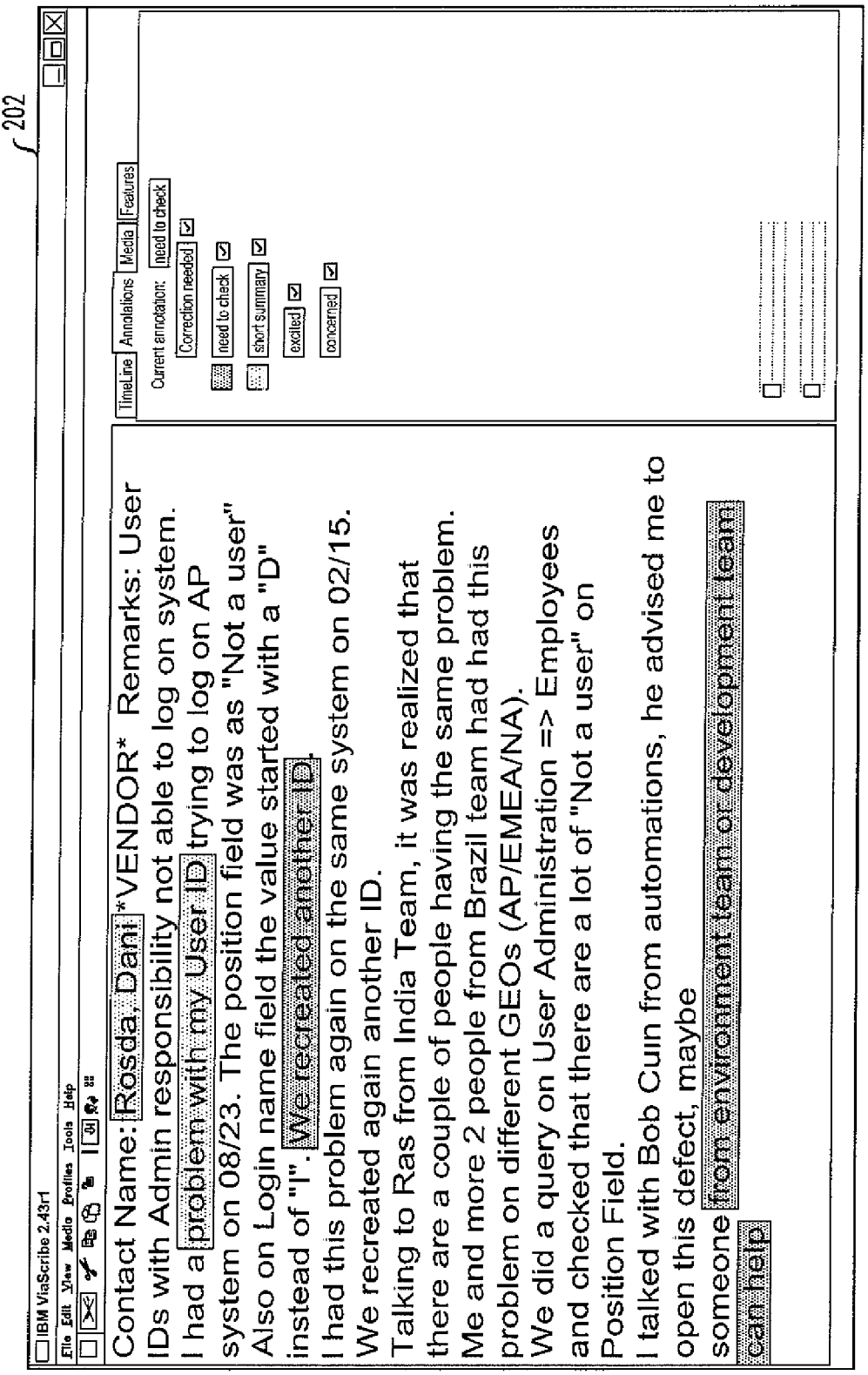
FIG. 2 is a diagram illustrating an exemplary tool used for real time annotation and translation, according to another aspect of the invention.

FIG. 2 is a diagram illustrating an exemplary tool used for real time annotation and translation, according to another aspect of the invention. Item 202 illustrates a tool for the collaborative annotation of text. If necessary, a customer representative (CR) may request more detailed annotation of specific terms in addition to the already existing annotated text to clarify some additional moments.

FIG. 2 shows an example of a user interface that can be used to annotate text data. The interface allows applying various types of annotation to text. Different types of annotations can be used, for example, by people with corresponding skills. For example, a technical specialist can annotate data related to her or his domain of expertise, while a writer can focus on the language-related features of the document. The annotation process can be distributed across a network allowing simultaneous annotation by different members of a team.

Figure 3:
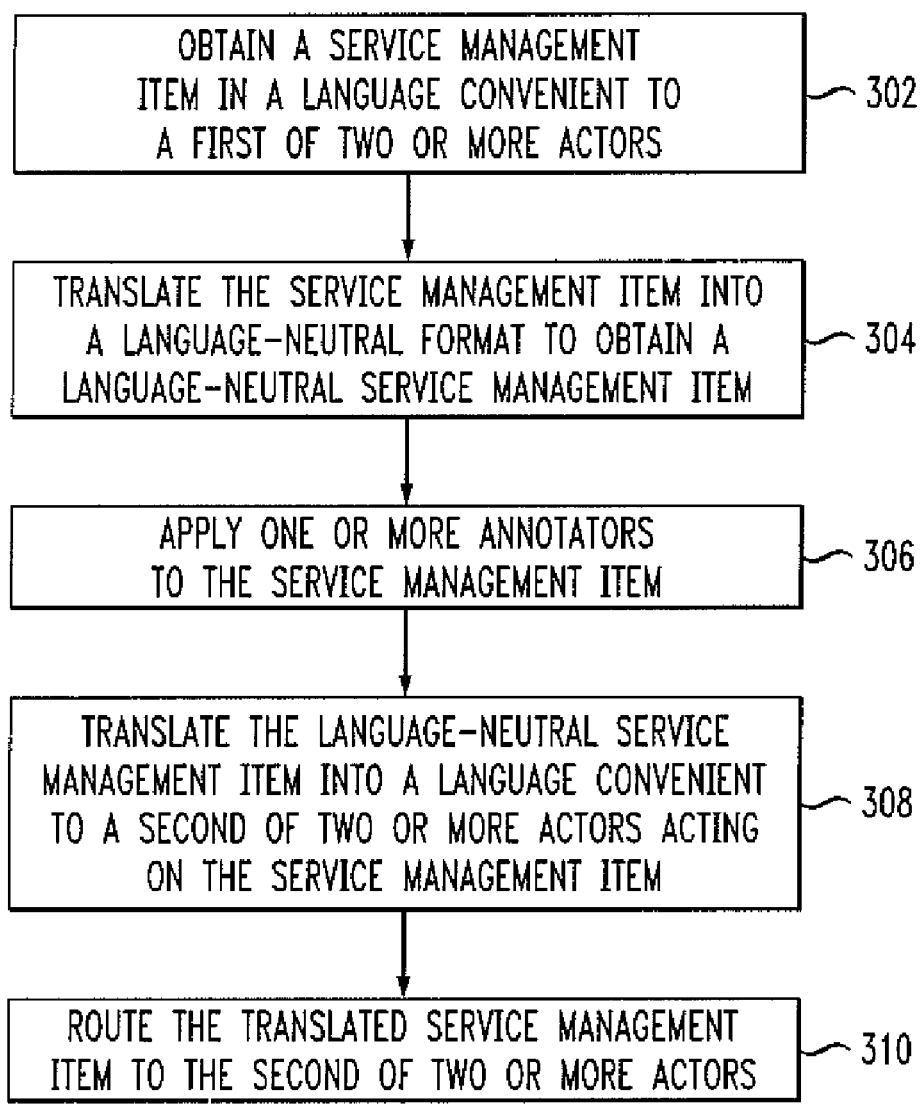
FIG. 3 is a flow diagram illustrating an exemplary method for globalizing handling of service management items, according to another aspect of the invention.

FIG. 3 is a flow diagram illustrating an exemplary method for globalizing handling of service management items, according to another aspect of the invention. Step 302 includes obtaining a service management item in a language convenient to a first of two or more actors. A service management item may include, for example, an incident ticket, a problem ticket, a change ticket, an incident report, a problem record or a change record. Step 304 includes translating the service management item into a language-neutral format to obtain a language-neutral service management item.

Step 306 includes applying one or more annotators to the service management item. At least some of the one or more annotators can be applied after translating the service management item, and at least some of the annotators can be applied in real time during the translation. The real time application of the annotators can be assisted by real time actor input by one or more actors. A language-neutral service management item can also be stored, with or without any corresponding annotators, in a searchable database.

Step 308 includes translating the language-neutral service management item into a language convenient to a second of two or more actors acting on the service management item. Also, an additional step may include determining a target for routing the service management item. A target may include, for example, one or more additional actors. Step 310 includes routing the translated service management item to the second of two or more actors.

Figure 4:
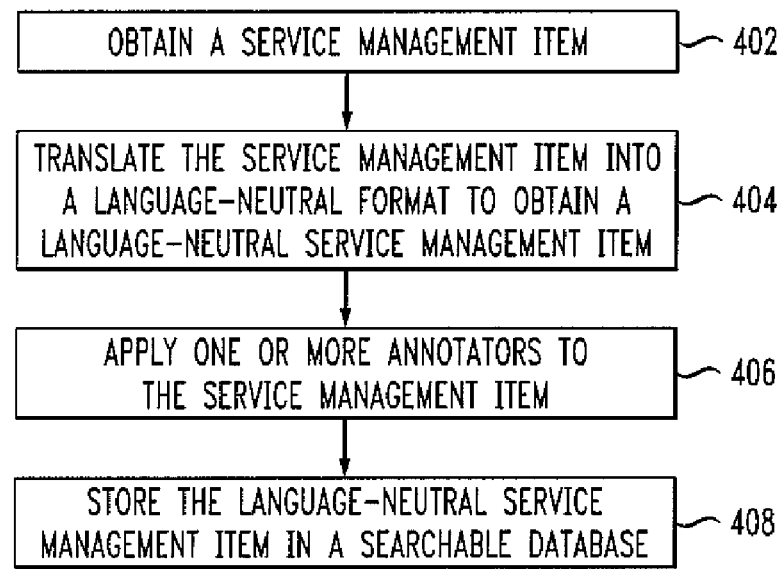
FIG. 4 is a flow diagram illustrating an exemplary method for generating a database of service management items in a language-neutral format, according to another aspect of the invention.

FIG. 4 is a flow diagram illustrating an exemplary method for generating a database of service management items in a language-neutral format, according to another aspect of the invention. Step 402 includes obtaining a service management item. Step 404 includes translating the service management item into a language-neutral format to obtain a language-neutral service management item. Step 406 includes applying one or more annotators to the service management item. Step 408 includes storing the language-neutral service management item in a searchable database.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 5:
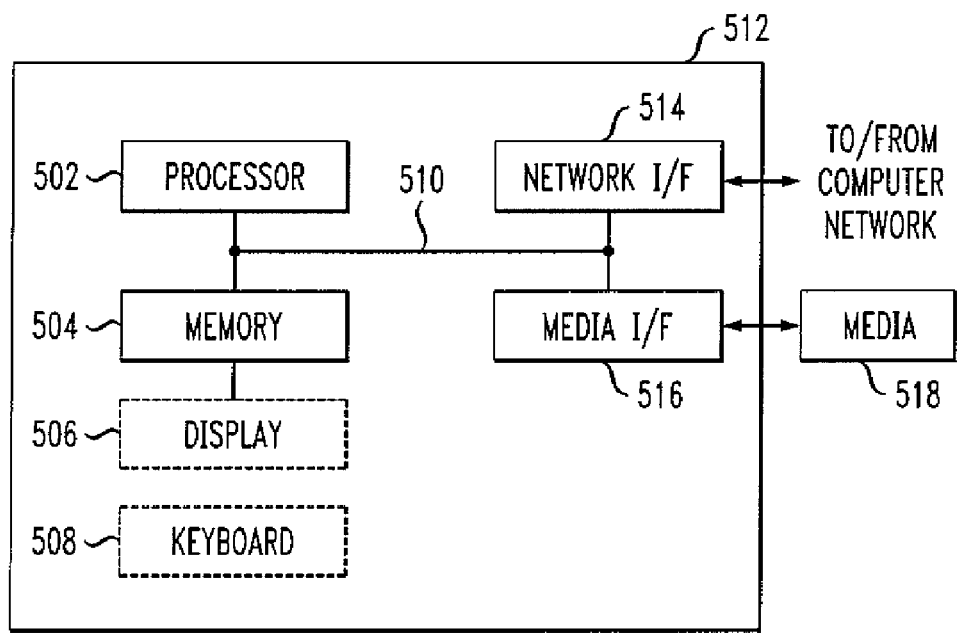
FIG. 5 is a system diagram of an exemplary computer system on which at least one embodiment of the present invention can be implemented.

At present, it is believed that the preferred implementation will make substantial use of software running on a general-purpose computer or workstation. With reference to FIG. 5, such an implementation might employ, for example, a processor 502, a memory 504, and an input and/or output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 502, memory 504, and input and/or output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 504), magnetic tape, a removable computer diskette (for example, media 518), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, reducing the cost of support services.

It should be noted that the invention is not limited to the precise exemplary embodiments detailed above, and that various other changes and modifications may be made by one skilled in the art.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for globalizing handling of service management items, comprising the steps of:

obtaining a service management item in a language convenient to a first of two or more actors;

translating the service management item into a language-neutral format to obtain a language-neutral service management item;

applying one or more annotators to the service management item, wherein the one or more annotators comprise one or more personalized annotators;

translating the language-neutral service management item into a language convenient to a second of two or more actors acting on the service management item; and routing the translated service management item to the second of two or more actors, wherein one or more of said steps are performed by a hardware device.

2. The method of claim 1, wherein the service management item comprises at least one of an incident ticket, a problem ticket, a change ticket, an incident report, a problem record and a change record.

3. The method of claim 1, wherein the step of obtaining a service management item in a language convenient to a first of two or more actors comprises obtaining a service management item in a same language as used by an individual providing the service management item.

4. The method of claim 1, wherein the language-neutral format comprise a common base language.

5. The method of claim 4, wherein the common base language comprises English.

6. The method of claim 1, wherein at least some of the one or more annotators are applied after translating the service management item.

7. The method of claim 1, wherein at least some of the one or more annotators are applied in real time during the translation.

8. The method of claim 7, wherein the real time application of the one or more annotators is assisted by real time actor input.

9. The method of claim 1, wherein the one or more annotators comprise one or more domain-specific annotators.

10. The method of claim 1, comprising the additional step of determining a target for routing the service management item.

11. The method of claim 1, wherein the step of translating the service management item into a language-neutral format comprises the first of two or more actors undertaking at least one of editing, correcting and deleting one or more of the one or more applied annotators.

12. The method of claim 1, further comprising the additional step of:
storing the language-neutral service management item in a searchable database.

13. A computer program product comprising a tangible computer readable recordable useable medium having computer useable program code for globalizing handling of service management items, said computer program product including:

computer useable program code for obtaining a service management item in a language convenient to a first of two or more actors;

computer useable program code for translating the service management item into a language-neutral format to obtain a language-neutral service management item;

computer useable program code for applying one or more annotators to the service management item, wherein the one or more annotators comprise one or more personalized annotators;

computer useable program code for translating the language-neutral service management item into a language convenient to a second of two or more actors acting on the service management item; and computer useable program code for routing the translated service management item to the second of two or more actors.

14. The computer program product of claim 13, wherein the service management item comprises at least one of an incident ticket, a problem ticket, a change ticket, an incident report, a problem record and a change record.

15. The computer program product of claim 13, wherein at least some of the one or more annotators are applied after translating the service management item.

16. The computer program product of claim 13, wherein at least some of the one or more annotators are applied in real time during the translation.

17. The computer program product of claim 16, wherein the real time application of the one or more annotators is assisted by real time actor input.

18. The computer program product of claim 13, wherein the one or more annotators comprise one or more domain-specific annotators.

19. A method for generating a database of service management items in a language-neutral format, comprising the steps of:

obtaining a service management item;

translating the service management item into a language-neutral format to obtain a language-neutral service management item;

applying one or more annotators to the service management item, wherein the one or more annotators comprise one or more personalized annotators; and storing the language-neutral service management item in a searchable database, wherein one or more of said steps are performed by a hardware device.

20. A computer program product comprising a tangible computer readable recordable useable medium having computer useable program code for generating a database of service management items in a language-neutral format, said computer program product including:

computer useable program code for obtaining a service management item;

computer useable program code for translating the service management item into a language-neutral format to obtain a language-neutral service management item;

computer useable program code for applying one or more annotators to the service management item, wherein the one or more annotators comprise one or more personalized annotators; and computer useable program code for storing the language-neutral service management item in a searchable database.

* * * * *